Dec. 3, 1935.  J. L. JONES  2,023,051
AUTOMATICALLY CONTROLLED ELECTRIC CIRCUIT
Filed Oct. 25, 1932   2 Sheets-Sheet 1
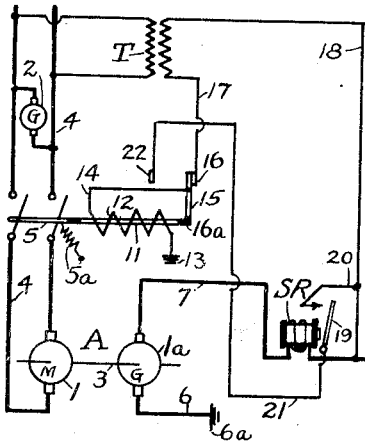
Fig. 1.
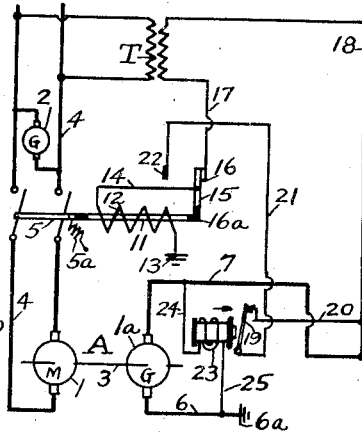
Fig. 2.
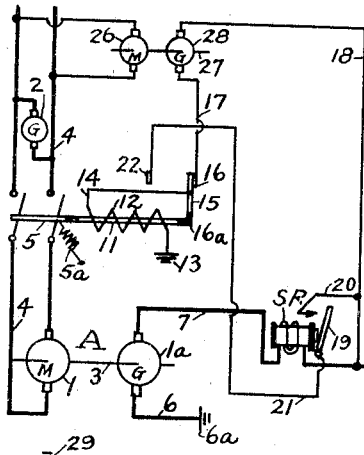
Fig. 3.
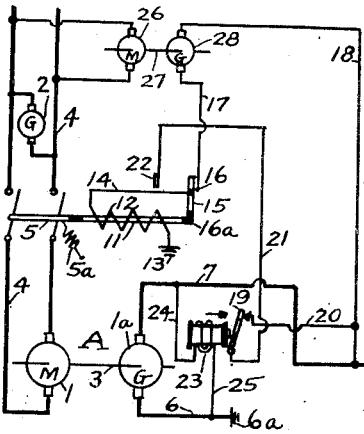
Fig. 4.
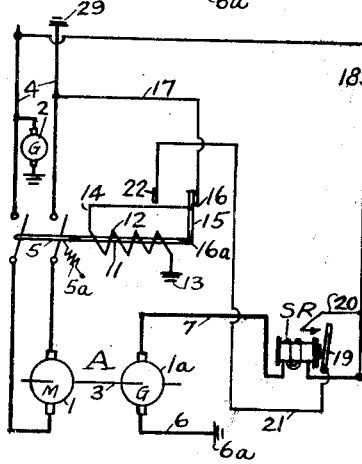
Fig. 5.
James L. Jones,
INVENTOR
ATTORNEY Dec. 3, 1935. J. L. JONES 2,023,051
AUTOMATICALLY CONTROLLED ELECTRIC CIRCUIT
Filed Oct. 25, 1932  2 Sheets-Sheet 2
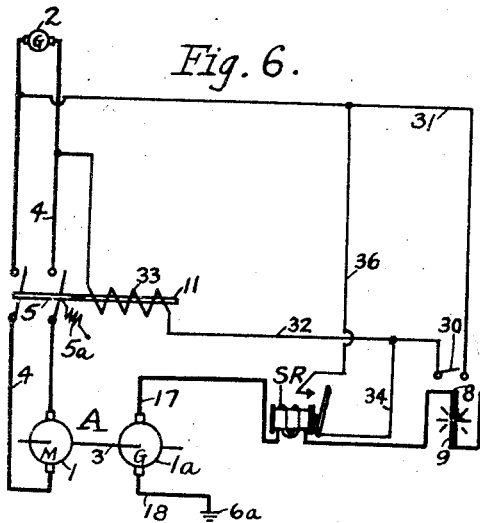
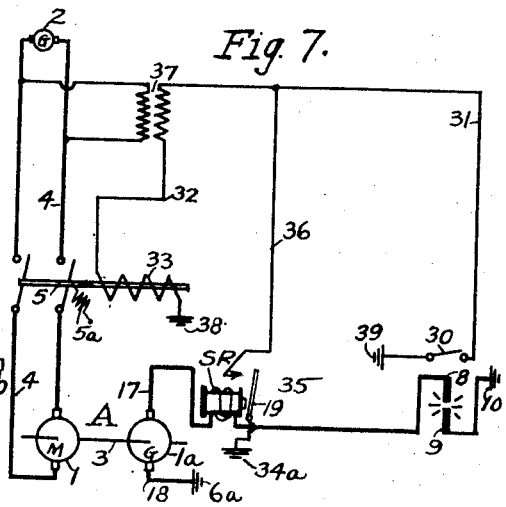
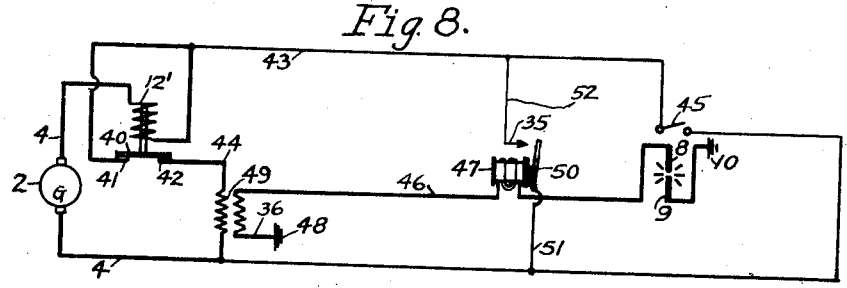
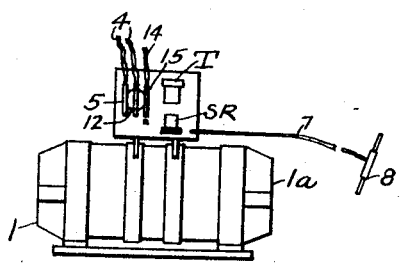
James L. Jones,
INVENTOR
BY
ATTORNEY Patented Dec. 3, 1935

2,023,051

UNITED STATES PATENT OFFICE 2,023,051

AUTOMATICALLY CONTROLLED ELECTRIC CIRCUIT

James L. Jones, Washington, D. C.

Application October 25, 1932, Serial No. 639,491

10 Claims. (Cl. 219—8)

My invention relates to electric circuits and to welding apparatus which constitutes a field of use of one type of means wherein such circuits may be advantageously employed.

The primary object is to provide for the conservation of electric energy when the circuit or apparatus is not in use, particularly by means which operate automatically to cut-off the electric current to a device operated thereby during its idle periods should they exceed a predetermined length of time.

Another important object is to provide means to carry out the principles of the invention in apparatus, for example, welding apparatus, in a self-contained unit, particularly to enable the improvements to be incorporated into or installed in the usual wiring of known apparatus so that such wiring will suffice without additional or materially additional wiring and further enable one to overcome the use of special switches, wiring and supports for the same used at the present time to control (especially at a distance) the flow of operating current.

A further object is to provide a circuit which enables the local or remote starting of operation of a generator or other source of power merely by closing a switch, preferably located convenient to an operator, or grounding the welding electrode or other device by using the existing welding or other power circuit as the starting circuit also, being especially adaptable to arc welding where an operator is frequently required to work at a considerable distance from the source of power.

Various additional objects and advantages will in part be pointed out and otherwise become apparent from a consideration of the description following taken in connection with accompanying drawings.

In said drawings each of Figures 1 to 8 is a diagram of a different electric circuit or apparatus embodying the invention and Figure 9 is an elevation of a self-contained arc welding outfit or apparatus constructed in accordance with the invention.

Referring first to the form of Figure 1, a motor generator set is shown at A, having an electric motor 1, adapted to drive a generator 1a through the medium of a shaft 3. Electric energy from any suitable source conventionally shown as a generator 2, passes through feed lines 4, containing a magnetic switch 5, normally held in an open position by a spring 5a, as shown, by gravity or in any desired manner. A double pole switch is shown, but any number of poles may be used, however, as is necessary to suit the source of current.

Said generator 1a, has one pole grounded as at 6a and a conductor 7 leads from its other polarity to a device which utilizes electric energy as for instance an arc welding electrode 8, which coacts with but is mechanically disconnected from work 9, such as metal being welded and which is grounded as at 10.

Where grounded circuits are shown in the diagrams, insulated circuits may be substituted in the conventional manner.

The said magnetic switch 5 is automatically closed in starting an operation by grounding the electrode 8. To this end switch 5 is controlled by an armature 11, surrounded by a coil 12, grounded at 13. Said coil has a conductor 14, leading to a contact 15, and movable with the armature but insulated therefrom at 16a. When the apparatus is at rest, contact 15 is in engagement with a stationary contact 16. A conductor 17 leads from one side of the secondary of a transformer T to contact 16 and a conductor 18 leads from the other side of the transformer secondary to the conductor 7. The transformer T is operatively connected with its primary energized by feed wires 4.

The switch 5 in Fig. 1 is adapted to automatically open either by current or amperage generated by member 1a dropping to a predetermined amount, occasioned by idleness or failure of application of electrode 8 to the work. To this end, a relay SR preferably of the dash pot or delayed action type is connected in conductor 7 and coacts with an armature 19. The coil of relay SR is wound so that when the current is above or at a predetermined amount, or when the voltage thereacross is above or at a predetermined amount, the armature 19 will be held closed against a branch conductor 20 of the conductor 18. From armature 19, a conductor 21 leads to a contact 22 with which contact 15 engages in the closed position of switch 5.

It will be realized that the action of coil SR is preferably delayed sufficiently to cause the motor circuit to be opened only after electrode 8 has been removed from contact with work 9 for a short interval.

Presuming the circuit or apparatus to be at rest, and the parts in the position of Figure 1, operation is started by grounding electrode 8 which causes current to flow from the source through feeders 4, transformer T, conductors 18 and 7, electrode 8, work 9 to ground on the one side and on the other side through conductor 17, contacts 16 and 15, conductor 14 and coil 12 to ground.

Thus coil 12 is energized and moves armature 11 so as to close switch 5 and engage contacts 15 and 22. Relay SR under these conditions functions as a holding coil for switch 5 and the welding process or other utilization of current from generator 2 may then proceed. When the welding current is interrupted, the series relay SR moves armature 19 from engagement with branch conductor 20 to thus break the circuit to coil 12 whereupon armature 11 is retracted and the switch 5 opened and the motor 1 deenergized.

The invention has practical application in an arc welding outfit or apparatus as shown in Figure 9, it being particularly noted that the same is a self-contained unit, requiring substantially no additional wiring over equipment now in use but merely the incorporation of the several additional devices therein and particularly avoiding the use of special switches, wiring and parts, usually used, for remote electrical control.

In using the equipment, the electrode 8 may be freely or normally applied to and removed from the work being welded, the wiring of the relay SR permitting the current to decrease to the point where the voltage of the generator increases or builds up (say to 50 volts) over the operating voltage (say 40 volts) without opening switch 5. However, the wiring of relay SR will cause the opening of switch 5 upon the electrode 8 remaining out of working relation with the work for say 30 seconds or any other predetermined length of time. An apparatus according to the present invention therefore cannot continue to run and consume energy as in cases where the workman neglects to manually operate a stop switch, due to time consumed and distance it would be necessary to walk to do so or for other reasons.

Electrode 8 is to be considered as a broad showing of any device operated by or consuming electric energy since the principles of the invention may be equally well applied for example where motors, generators, transformers and the like are used in the circuit instead of the electrode.

In Figure 2 a slightly modified form is shown and it differs from the form of Figure 1 only in using a shunt relay 23 wired at 24 and 25 across conductors 6 and 7, to replace the series coil SR.

Another slight modification in Figure 3 consists in replacing the transformer T of Figure 1 with a motor generator set consisting of a motor 26, shaft 27 and a generator 28 driven by the shaft from the motor.

Figure 4 shows the embodiment of said shunt relay parts 23, 24 and 25 of Figure 2 and the motor generator, parts 26, 27 and 28 of Figure 3 in the circuit of Figure 1 in place of the transformer T and series relay SR, respectively.

In the circuits of Figures 1 to 4, the transformer or motor generator may be eliminated if desired and one side of the feed line grounded as at 29 in Figure 5, the circuit otherwise specifically corresponding to that of Figure 1.

Figure 6 discloses a form wherein the closing of the motor (1) circuit depends upon manual operation of a switch 30, rather than through grounding of the electrode or equivalent device 8. In this instance, the said switch 30 which is preferably of the momentary closed type, that is, will automatically open, after closing and release of the contacts, connects conductors 31 and 32 leading from feed wires 4. In wire 32, a magnetic coil 33 similar to that at 12 is connected to co-act with the armature 11, and switch 5.

The armature 19 of the series coil SR is connected by a wire 34 to conductor 32, and it moves to and from a contact 35 on a branch 36 of conductor 31, so that coil SR acts as a holding coil for switch 5 after switch 30 is released and while current is flowing in wires 17 and 18. Upon interruption of current or increase of voltage in wires 17 and 18, armature 19 opens the circuit to coil 33 thereby opening switch 5.

The form of Figure 7 generally corresponds to that of Figure 6 but specifically differs therefrom in that a transformer 37 is employed across conductors 31 and 32 and the coil 33 and switch 30 are grounded, respectively, at 38 and 39. Also armature 19 is grounded at 34a.

The modification of Figure 8 generally corresponds to the circuits of Figures 6 and 7 but employs a switch in one side of the feed line only as at 40. Switch 40 co-acts with contacts 41 and 42 of conductors 43 and 44, the latter leading to one of the feed wires. The other feed wire 4 includes a magnetic coil 12' like that at 12 and 33 and a switch 45 like that at 30, connects conductor 43 and one feed wire 4. A conductor 46 includes a series relay 47 and leads to an electrode or equivalent 8 co-acting with metal or work 9 grounded at 10 as in the previous forms. Conductor 36 is grounded at 48 and a transformer 49 is connected to this conductor and conductor 44. Series relay 47 corresponds to that at SR and has a similar co-acting armature at 50 which is wired at 51 to one feed wire 4 and moves to and from a branch 52 of conductor 43. Thus when switch 45 is momentarily closed current from the feed lines 4 energizes coil 12' thereby closing switch 40 so that the current flows through transformer 49 to the electrode 8 when the latter is grounded. Thereafter the series relay 47 and armature 50 control the circuit and function to attain the same results as the corresponding parts in the other forms.

Said Figure 9 is to be considered as a self-contained unit embodying any of the electric circuits of Figures 1 to 8.

It is obvious that where series relays or shunt relays are employed, either type may be used or that combined series and shunt relays may be substituted, also that switches may be substituted for relays and that various other changes may be resorted to provided they fall within the spirit and scope of the invention:

I claim:—

1. In combination with a source of electrical energy having a driving motor, means to establish an operating circuit from said source, said circuit also being the stopping and starting circuit for the driving motor, said means including a switch, and means also energized from said source operable to automatically close and hold said switch closed through the action of a load in the circuit of the source of electrical energy and automatically open said switch after removal of the load for a predetermined time.

2. A power supply system for changing electrical energy of one form to electrical energy of another form comprising a device having a power input circuit and a power output circuit, a source of electrical energy, a switch for connecting said source of electrical energy to the power input circuit of said device, means for automatically closing said switch to connect said source of electrical energy to the power input circuit of said device responsive to the closure of the power output circuit of said device, means responsive to the flow of current of a predetermined value